US009523580B2

(12) United States Patent
Mohideen et al.

(10) Patent No.: US 9,523,580 B2
(45) Date of Patent: Dec. 20, 2016

(54) SYSTEM AND METHOD FOR AIDING A PILOT IN LOCATING AN OUT OF VIEW LANDING SITE (71) Applicant: HONEYWELL INTERNATIONAL INC., Morristown, NJ (US)

(72) Inventors: Mohammed Ibrahim Mohideen, Karnataka (IN); Sunita Patil, Karnataka (IN); Anoop S, Karnataka (IN); Steve Kilbourne, Oswego, IL (US); Ronald Brian Wayman, Auburn, WA (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 32 days.

(21) Appl. No.: 14/558,195

(22) Filed: Dec. 2, 2014

(65) Prior Publication Data
US 2016/0152348 A1  Jun. 2, 2016

(51) Int. Cl.
*B64F 1/18* (2006.01)
*G01C 21/00* (2006.01)
*G01C 23/00* (2006.01)
*G05D 1/02* (2006.01)

(52) U.S. Cl.
CPC .............. *G01C 21/00* (2013.01); *G01C 23/005* (2013.01); *G05D 1/0202* (2013.01)

(58) Field of Classification Search
CPC .......... B64F 1/18; G01C 21/00; G01C 23/005; G05D 1/0202
USPC ........................................................ 701/16
See application file for complete search history.

(56) References Cited

U.S. PATENT DOCUMENTS

| 3,449,713 | A |   | 6/1969  | Kaiser |
|-----------|---|---|---------|--------|
| 5,936,553 | A | * | 8/1999  | Kabel ............... G01C 21/3635 340/990 |
| 6,272,404 | B1 |  | 8/2001  | Amano et al. |
| 7,312,725 | B2 | * | 12/2007 | Berson ................. G01C 23/00 340/461 |
| 8,224,508 | B2 |  | 7/2012  | Bacabara et al. |
| 8,392,037 | B2 |  | 3/2013  | Sahasrabudhe et al. |
| 8,485,029 | B2 |  | 7/2013  | Anders |

(Continued)

FOREIGN PATENT DOCUMENTS

JP    2002145197 A    5/2002
WO    2009081177 A2    7/2009

OTHER PUBLICATIONS

Eger, T.W.; Combat Development Division German Army Aviation (GE), Operational requirements for short-term solution in visual display specifically for Degraded Visual Environment (DVE);Airborne Intelligence, Surveillance, Reconnaissance (ISR) Systems and Applications IX; Proc. of SPIE vol. 8360, 83600L • © 2012 SPIE.

(Continued)

*Primary Examiner* — Atul Trivedi
(74) *Attorney, Agent, or Firm* — Lorenz & Kopf, LLP (57) ABSTRACT

A system and method for displaying symbology that is indicative of the direction of a landing site is provided. The provided system and method generate and display, prior to the rotorcraft reaching the MAP, symbology that conveys visual guidance that may be quickly and easily comprehended by a pilot. The provided system and method reduce the pilot's visual scan area and associated search time, reducing cognitive workload and increasing situational awareness.

20 Claims, 5 Drawing Sheets

(56) References Cited

U.S. PATENT DOCUMENTS

| | | | | |
|---|---|---|---|---|
| 8,665,121 B2* | 3/2014 | Shavit | | G08G 5/0043 340/945 |
| 8,831,796 B2* | 9/2014 | Samuthirapandian | . | G01C 23/00 340/973 |
| 9,129,521 B2* | 9/2015 | Gannon | | G08G 5/0047 |
| 2001/0035832 A1* | 11/2001 | Block | | G08G 5/0021 340/971 |
| 2007/0236366 A1* | 10/2007 | Gur | | G06K 9/00 340/945 |
| 2009/0138138 A1* | 5/2009 | Ferren | | G01C 23/00 701/3 |
| 2009/0140885 A1* | 6/2009 | Rogers | | G01C 5/005 340/977 |
| 2010/0026525 A1* | 2/2010 | Feyereisen | | G01C 5/005 340/972 |
| 2010/0070176 A1* | 3/2010 | Feyereisen | | G01C 23/005 701/448 |
| 2010/0156758 A1* | 6/2010 | Anders | | G01C 23/005 345/8 |
| 2011/0082637 A1* | 4/2011 | Green | | G01C 21/3476 701/532 |
| 2012/0056759 A1* | 3/2012 | He | | G01C 23/00 340/960 |
| 2013/0027226 A1* | 1/2013 | Cabos | | G08G 5/0013 340/961 |
| 2013/0046462 A1* | 2/2013 | Feyereisen | | G08G 5/025 701/457 |
| 2014/0002280 A1* | 1/2014 | He | | G05D 1/102 340/946 |
| 2014/0058675 A1* | 2/2014 | He | | G01C 21/00 701/533 |
| 2014/0207315 A1* | 7/2014 | He | | G01C 23/005 701/16 |
| 2014/0246541 A1* | 9/2014 | Feyzeau | | G05D 1/0676 244/1 N |
| 2014/0350754 A1* | 11/2014 | Elgersma | | G08G 5/025 701/16 |

OTHER PUBLICATIONS

Doehler, H.U.; Improving visual-conformal displays for helicopter guidance; SPIE Newsroom 10.1117/2.1201310.005162; 2013.

Sferion, Pilot assistance during the entire mission under all conditions; Copyright 2013 Cassidian.

Extended EP search report for Application No. 15196385.7-1557 dated Mar. 31, 2016.

* cited by examiner

SYSTEM AND METHOD FOR AIDING A PILOT IN LOCATING AN OUT OF VIEW LANDING SITE

TECHNICAL FIELD

Embodiments of the subject matter described herein relate generally to rotorcraft display systems and, more particularly, to displaying guidance symbology on a rotorcraft display system that is indicative of the direction of an out of view landing site.

BACKGROUND

The approach to landing and landing are complex rotorcraft operations requiring a pilot to quickly react with precise actions. The route that a rotorcraft travels toward a designated landing site includes a designated location referred to as a "missed approach point" (MAP). Prior to reaching the missed approach point, a rotorcraft pilot relies on onboard instruments and displays to guide his travel path. The pilot is expected to acquire and maintain visual contact with the landing site by the time the rotorcraft reaches the MAP. Generally, the visual search area is defined by a direct line of sight plus or minus thirty degrees; in other words, the full visual scan area may be a cognitively-exhausting sixty degrees. If visual contact with the landing site has not been made by the time the rotorcraft reaches the MAP, the pilot must execute an associated missed approach point operation, which may include abandoning the landing site or executing a looping travel path in another attempt. Therefore, prior to reaching the MAP, the rotorcraft pilot is concurrently viewing onboard rotorcraft display systems and a wide swath of the outside environment, thereby experiencing a high cognitive workload.

Even with support from traditional rotorcraft onboard display systems, acquiring visual contact with the landing site when the rotorcraft is at or prior to the MAP may be challenging. For example, the actual landing site may be a significant distance from the MAP, may not be visible due to distance or obstructions (even in daytime) and may be in an unfamiliar terrain or at an unfamiliar airport. In addition, the coordinates provided for the landing site may have slight inaccuracies; each of these scenarios may increase pilot cognitive workload. Therefore, a rotorcraft display system that provides symbology that directs the pilot's gaze toward the landing site prior to the MAP is needed.

In view of the foregoing, a system and method for displaying, prior to rotorcraft reaching the MAP, symbology that is indicative of the direction of a landing site are desirable. The desired system and method generate and display, prior to the rotorcraft reaching the MAP, symbology that conveys visual guidance that may be quickly and easily comprehended by a pilot. The desired system and method reduce the pilot's visual scan area and associated search time, reducing cognitive workload and increasing situational awareness.

BRIEF SUMMARY

This summary is provided to introduce a selection of concepts in a simplified form that are further described below in the detailed description section. This summary is not intended to identify key features or essential features of the claimed subject matter, nor is it intended to be used as an aid in determining the scope of the claimed subject matter.

A method for displaying, on a rotorcraft display system, symbology indicative of the direction of a rotorcraft landing site is provided. The method comprises processing avionics data to determine (i) rotorcraft current position, (ii) rotorcraft current approach course, and (iii) a direction from the rotorcraft current position to the rotorcraft landing site. The method displays symbology indicative of the direction to the rotorcraft landing site from the rotorcraft current location.

A rotorcraft display system for providing symbology indicative of the direction of a landing site is also provided. The system comprises a source of avionics data, a display system, and a processor that is coupled to the source of avionics data and the display system. The processor is configured to (i) receive the avionics data; (ii) determine a rotorcraft current position; (iii) determine a rotorcraft current approach course; (iv) determine a direction from the current position to the landing site; and (v) generate symbology on the display system that is graphically indicative of the direction from the current position to the landing site.

Another method for displaying, on a rotorcraft display system, symbology indicative of the direction of a rotorcraft landing site is provided. The method comprises receiving avionics data, determining, in response to the avionics data, i) the direction of the rotorcraft landing site from the rotorcraft current position, and ii) a safe landing area; and displaying symbology indicative of i) the direction of the rotorcraft landing site from the rotorcraft current position, and ii) the safe landing area.

Other desirable features will become apparent from the following detailed description and the appended claims, taken in conjunction with the accompanying drawings and this background.

BRIEF DESCRIPTION OF THE DRAWINGS

A more complete understanding of the subject matter may be derived from the following detailed description taken in conjunction with the accompanying drawings, wherein, like reference numerals denote like elements, and.

DETAILED DESCRIPTION

The following Detailed Description is merely exemplary in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over any other implementations. Furthermore, there is no intention to be bound by any expressed or implied theory presented in the preceding Technical Field, Background, Brief Summary or the following Detailed Description.

Techniques and technologies may be described herein in terms of functional and/or logical block components and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following descriptions may refer to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting.

The below descriptions refer to rotorcraft display systems that pilots rely upon for the presentation of information that assists in operational decisions. A modern rotorcraft display system typically includes a primary flight display (PFD) that conveys information in a two dimensional display format (for example, a compass display) as well as a unified three dimensional (3D) graphical display of the terrain (usually a 3D synthetic vision display). The unified 3D graphical display combines information obtained from various databases, sensors and transponders, organized as "information layers" (e.g., flight path information, Navigational Aids (NAVAID), airspace information, terrain information, weather information, traffic information, and the like) and is overlaid with various symbolic and textual representations. The rotorcraft pilot is heavily dependent upon this information during the course of all rotorcraft operations.

Figure 1:
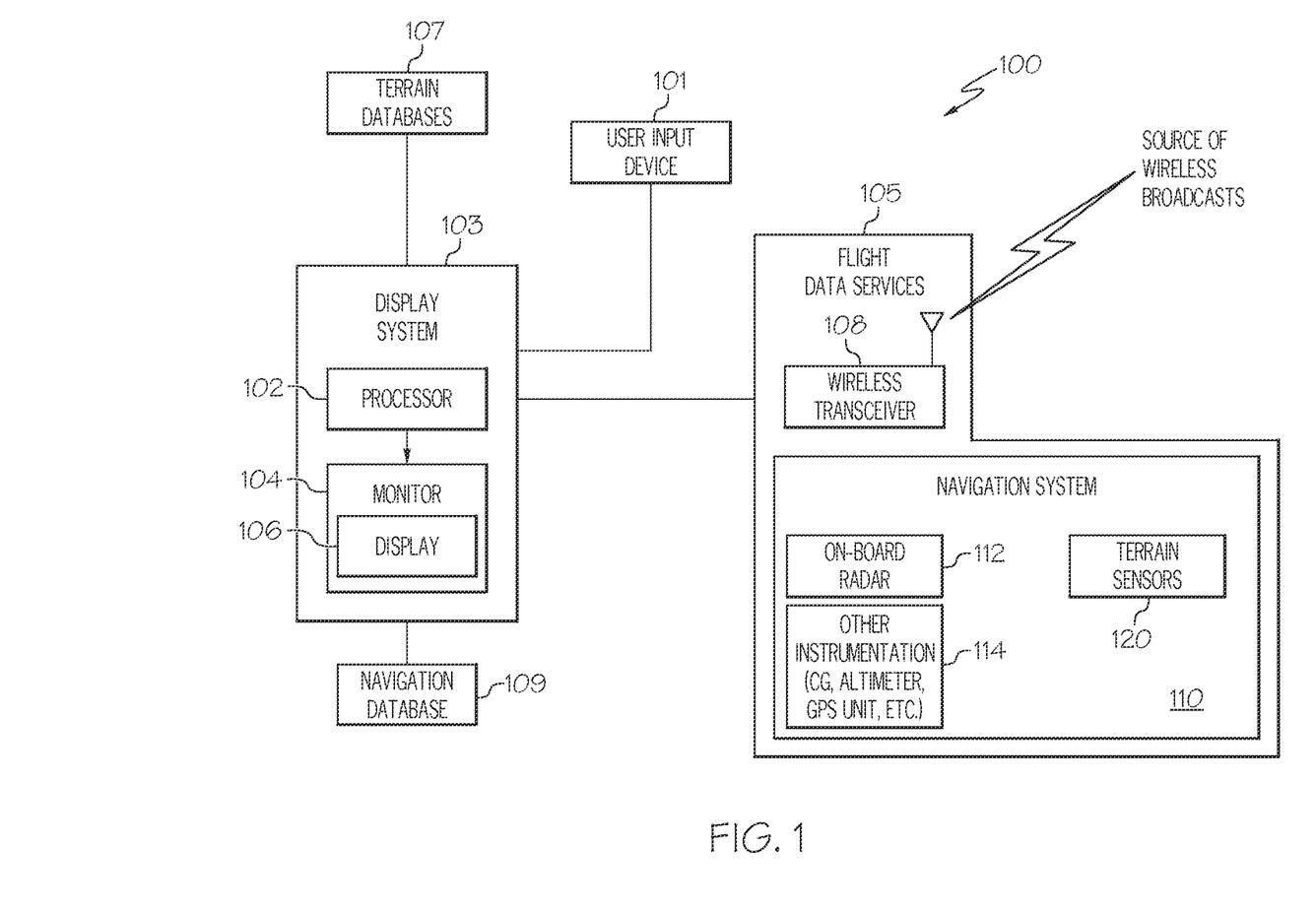
FIG. 1 is a block diagram of a generalized rotorcraft display system, in accordance with an exemplary embodiment.

FIG. 1 is a block diagram of a generalized rotorcraft display system in accordance with an exemplary embodiment. Rotorcraft display system 100 includes a user input device 101, a display system 103, flight data services 105, terrain database 107, and navigation database 109. Display system 103 includes at least one processor 102, and at least one monitor 104, including a display 106, each of which is operatively coupled to processor 102. The user input device 101, display system 103, flight data services 105, terrain database 107, and navigation database 109, are also operatively coupled to the processor 102 within display system 103.

Flight data services 105 include a wireless transceiver 108 and a navigation system 110, which are operatively coupled to the processor 102. Navigation system 110 includes onboard radar 112 and other onboard instrumentation 114, such as a radio altimeter, a barometric altimeter, a global positioning system (GPS) unit, and the like. Navigation system 110 also includes terrain sensors 120, and depending upon the host rotorcraft, the navigation system 110 may be included within a FMS. Terrain sensors 120 may be additional on-board radar, or may be on-board Lidar or other instruments capable of dynamically ascertaining elevation and terrain information. In some embodiments, onboard radar 112 and terrain sensors 120 may be included within a Terrain Awareness and Warning System (TAWS), such as an Enhanced Ground Proximity Warning System (EGPWS).

Flight data services 105 receive data from wireless transceiver 108 and the sensors and instruments included within the navigation system 110. Flight data services 105 continuously relay this data to processor 102. Depending upon the type of rotorcraft in which the embodiment is employed, wireless transceiver 108 may receive Traffic Information Services-Broadcast (TIS-B) data from external control sources, such as satellite and various ground-based facilities including Air Traffic Control Centers, Terminal Radar Approach Control Facilities, Flight Service Stations, control towers, and the like. In addition, wireless transceiver 108 may receive Automatic Dependent Surveillance-Broadcast (ADS-B) data and Traffic Collision Avoidance System (TCAS) data from neighboring rotorcraft, as well as weather information. TIS-B data, ADS-B data, TCAS data and other such external source data are preferably formatted to include air traffic state vector information, which may be utilized to determine a neighboring rotorcraft's current position and velocity.

Within display system 103, processor 102 may comprise, or be associated with, any suitable number of individual microprocessors, flight control computers, navigational equipment, memories, power supplies, storage devices, interface cards, and other standard components known in the art. In this respect, the processor 102 may include or cooperate with any number of software programs (e.g., rotorcraft display programs) or instructions designed to carry out the various methods, process tasks, calculations, and control/display functions described below. Depending upon the host rotorcraft, processor 102 may be included within a Flight Management Computer of the type commonly deployed within a Flight Management System (FMS). The processor 102 receives or obtains input from flight data services 105, terrain database 107, terrain sensors 120, navigation database 109, and user input device 101, and processes the combined information. In response to the various inputs, the processor 102 drives the monitor 104 to generate and update the display 106.

Image-generating devices suitable for use as monitor 104 include various analog (e.g., cathode ray tube) and digital (e.g., liquid crystal, active matrix, plasma, etc.) display devices. In certain embodiments, monitor 104 may assume the form of a Head-Down Display (HDD) or a Head-Up Display (HUD) included within a rotorcraft's Electronic Flight Instrument System (EFIS). Monitor 104 may be disposed at various locations throughout the cockpit. For example, monitor 104 may comprise a primary flight display (PFD) and reside at a central location within the pilot's primary field-of-view. Alternately, monitor 104 may comprise a secondary flight deck display, such as an Engine Instrument and Crew Advisory System (EICAS) display, mounted at a location for convenient observation by the rotorcraft crew but that generally resides outside of the pilot's primary field-of-view. In still further embodiments, monitor 104 may be worn by one or more members of the flight crew.

During operation of rotorcraft display system 100, the processor 102 continuously receives input from devices and subsystems coupled thereto, such as the flight data services 105 (typically providing navigational data pertaining to terrain, weather, neighboring rotorcraft, and the like), the terrain database 107 (which is typically uploaded to the processor 102 once prior to a flight), the user input device 101, and the navigational database 109. Taken together, the various inputs to the processor are referred to as "avionics data." Avionics data includes current position and current approach course, landing site information, and the "missed approach point," or MAP.

The processor 102 processes the avionics data and drives monitor 104 to produce a graphical display 106 that visually provides a pilot and crew with a composite of navigation information pertaining to the host rotorcraft, weather, navigational aids (NAVAID), elevation and terrain, and rotorcraft traffic. Processor 102 may provide the display 106 with a composite image in a two dimensional format (e.g., as a moving map display or compass), or a three dimensional format (e.g., as a perspective display), or in a hybrid format (e.g., in a picture-in-picture or split screen arrangement).

Elevation and terrain information may be a combination of low resolution and high resolution geographic information. The terrain information is generally obtained from existing terrain database 107 and loaded a priori; example geographic databases include but are not limited to DTED as well as bare earth and Lidar survey Digital Elevation Maps data. The terrain database 107 may provide configuration files and rotorcraft landing surface information. High resolution data may also be obtained and dynamically updated from terrain sensors 120. As described hereinabove, terrain sensors may be radar, Lidar, or other devices suitable for dynamically providing elevation and terrain information.

The user input device 101 may be realized as a keypad, touchpad, keyboard, mouse, touchscreen, joystick, knob, microphone, speech recognition device, gesture interpretation device or another suitable device adapted to receive input from a user. The pilot may adjust and customize aspects of the display and method by entering user input parameters using the user input device 101. Adjustments according to user input are performed by the processor 102.

Examples of user input parameters include, but are not limited to, object descriptions such as: arrow dimensions and color, a first predetermined shape dimensions and shading (the first predetermined shape is used for a zone, described hereinbelow), a second predetermined shape (the second predetermined shape is used to indicate rotorcraft current position, also described hereinbelow), and landing site data. User input via the user input device 101 may also include visual distinguishability effects of objects, such as line or edge thickness, colors, shading, highlighting, color transitions, hatching, landing site data, and the like.

Figure 2:
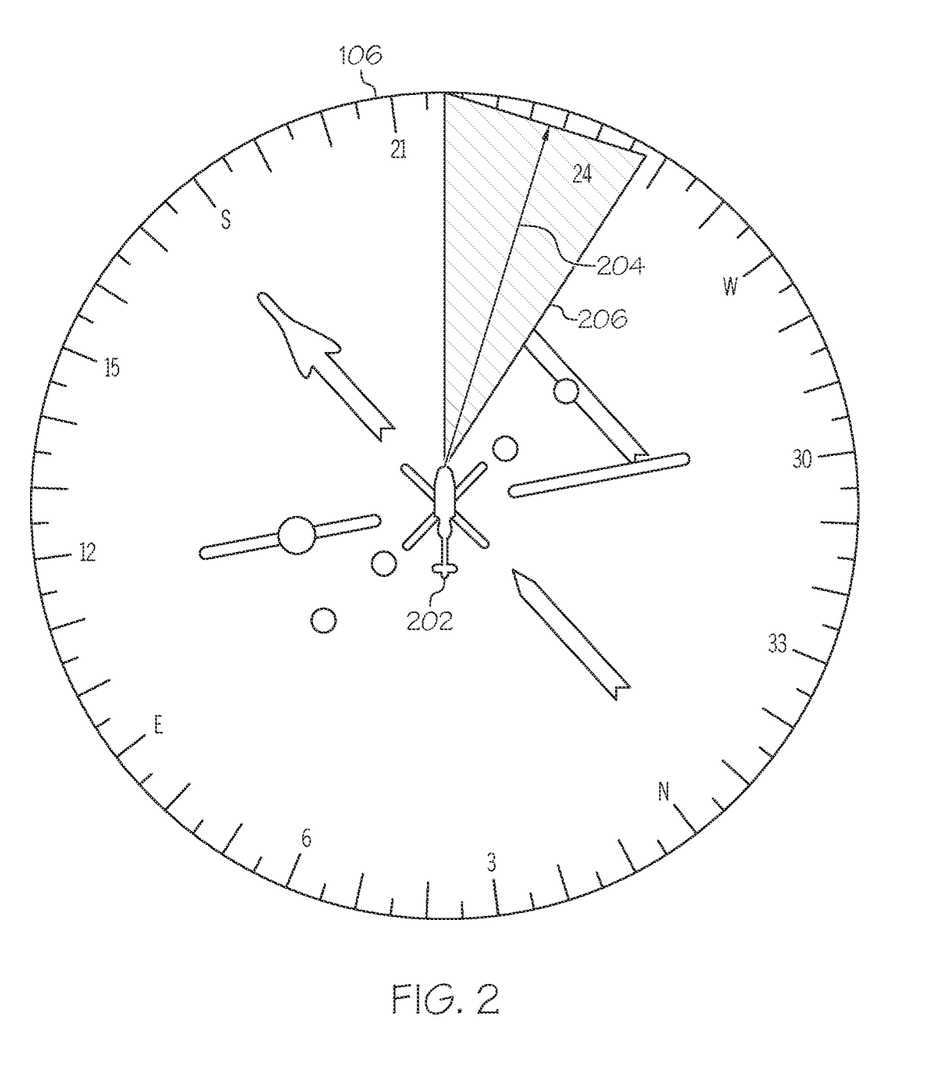
FIG. 2 illustrates a typical rotorcraft display system graphic of a compass display, in accordance with an exemplary embodiment.

FIG. 2 illustrates a typical rotorcraft display system graphic in which the display 106 is a compass, in accordance with an exemplary embodiment. Rotorcraft 202 is depicted at its current position and centered within the compass of display 106. As described in connection with FIG. 5, when the processor has received avionics data such as current position, current approach, a landing site and a MAP, the processor determines a direction to the landing site, and then commands the display to render symbology that is indicative of the direction. In FIG. 2, arrow 204 extends from the current position of rotorcraft 202 outward within the compass, indicating the direction of the landing site (not shown).

As previously mentioned, the field of view that a rotorcraft pilot has when the rotorcraft is directly facing the landing site is typically plus or minus thirty degrees. Advantageously, the exemplary embodiment provides additional direction to the pilot by narrowing the scan area to plus or minus five degrees; thereby reducing cognitive workload. This narrowed scan area, defined by zone 206, extends substantially five degrees on each side of arrow 204. The corresponding symbology is visually indicative of the direction to a safe landing area, and is designed to account for slight imperfections in the landing site coordinates that are provided from a database; in other words, the safe landing area informs the pilot that the intended destination could be anywhere within the safe landing area. Zone 206, optionally defined as a first predetermined shape, is shown as a hatched triangular area overlaid on the compass of display 106. Although zone 206 defaults to radially plus or minus substantially five degrees on each side of arrow 204, it is customizable via user input device 101.

Figure 3:
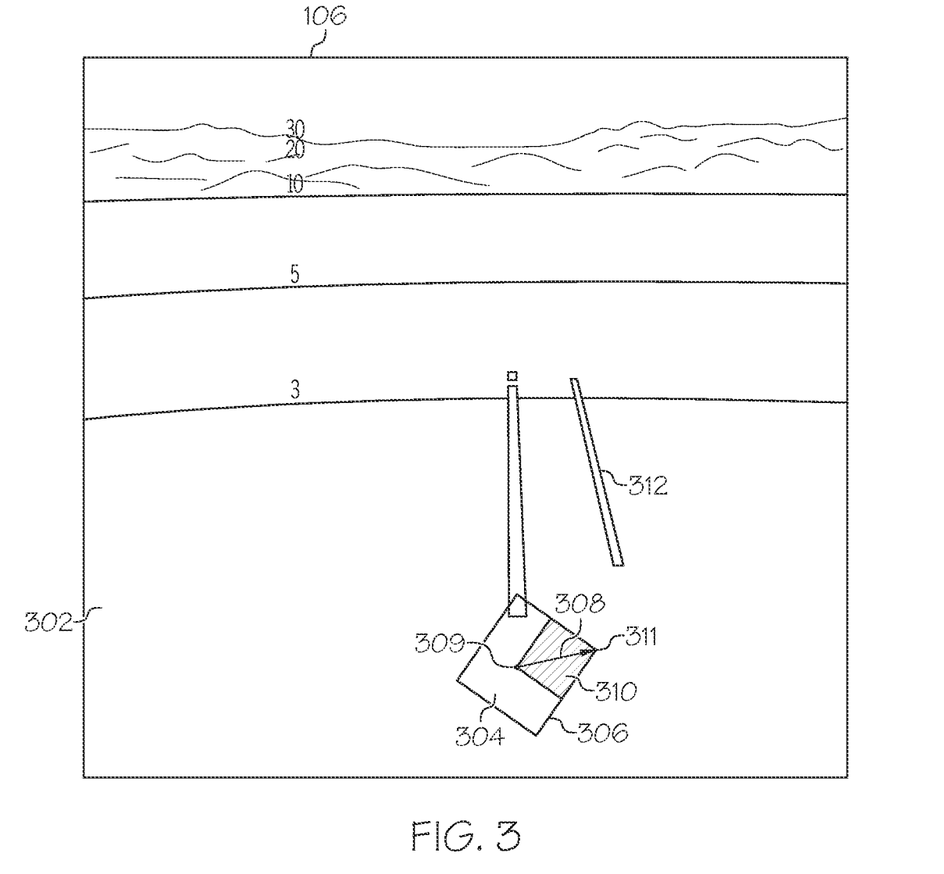
FIG. 3 illustrates a typical rotorcraft display system graphic in which the display is a 3D graphical display, in accordance with an exemplary embodiment.

FIG. 3 illustrates a typical rotorcraft display system graphic in which the display 106 is a 3D graphical display, in accordance with an exemplary embodiment. In display 106, the local terrain 302 is depicted hosting aircraft runways 312. As described in connection with FIG. 5, when the processor has received avionics data such as the current position, current approach, a landing site and a MAP, the processor determines a direction to the landing site, and then commands the display to render symbology that is indicative of the direction.

In a typical 3D graphical display, a target symbol is rendered to indicate the location of the landing site with respect to the rotorcraft; the specific symbol displayed may vary, in reflection of the rotorcraft, user input, or the like. In FIG. 3, polygon 304 is the target symbol. Polygon 304 is a second predetermined shape, comprising a plurality of edges 306 making up an enclosed boundary. The arrow 308 is rendered within polygon 304, and extends from the rotorcraft current position 309 to an edge or point 311 on the boundary of the polygon 304 that is nearest the landing site; therefore, arrow 308 indicates the direction of the landing site from the rotorcraft current position.

Similar to the description in connection with FIG. 2, processor 102 generates and overlays a visually distinguishable zone 310 around arrow 308. The visually distinguishable zone 310 is again described as the first predetermined shape, advantageously providing the pilot with a reduced scan area in the direction of the landing site. Zone 310 also represents an allowable safe landing area around the landing site. Once again, zone 310 defaults to substantially plus or minus five degrees on each side of the arrow, but may be customized via user input. Likewise, the various techniques mentioned hereinabove may be used to render the zone 310 in a visually distinguishable manner. Arrow 308 and zone 310 are rendered on display 106 prior to the rotorcraft reaching the designated MAP, thereby providing the pilot with early guidance as to where to focus to locate the landing site. The early guidance advantageously reduces the pilot's search area and therefore reduces cognitive workload.

Figure 4:
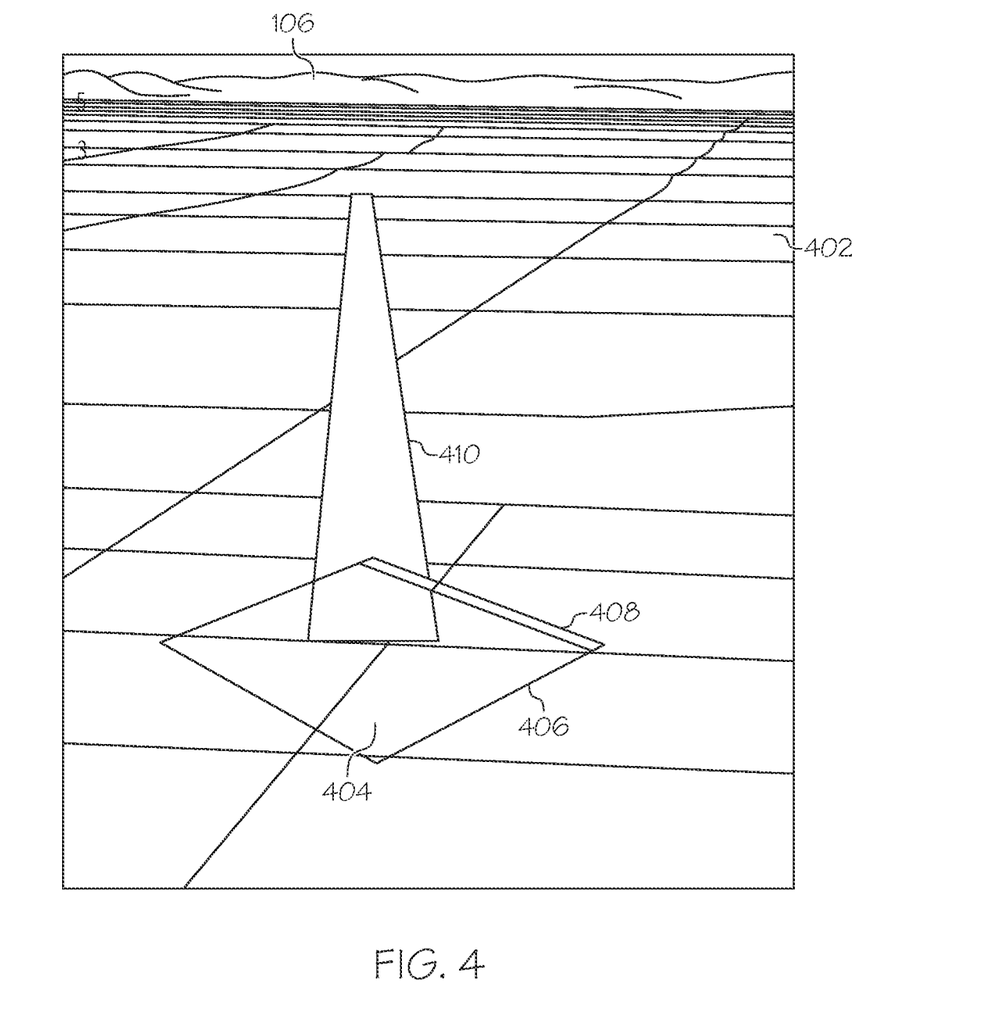
FIG. 4 illustrates a typical rotorcraft display system graphic in which the display is a 3D graphical display, in accordance with another exemplary embodiment.

FIG. 4 illustrates a typical rotorcraft display system graphic in which the display 106 is a 3D graphical display, in accordance with another exemplary embodiment. In graphical display 106, the local terrain 402 hosts aircraft runway 410. As described in connection with FIG. 5, when the processor has received avionics data such as current position, current approach, landing site and MAP data, the processor determines a direction to the landing site, and commands the display to render target symbology that is indicative of the direction.

The target symbol in FIG. 4 is polygon 404. Polygon 404 is the second predetermined shape, comprising a plurality of edges 406 making up an enclosed boundary. In the exemplary embodiment, processor 102 determines which of the edges of polygon 404 is closest to the landing site and renders that edge (closest edge 408) such that it is visually distinguishable from the remaining edges of polygon 404. As described hereinabove, various techniques may be used to render the edge 408 in a visually distinguishable manner, and the visually distinguishable edge 408 is rendered on display 106 prior to the rotorcraft reaching the MAP, thereby providing the pilot with early guidance as to where to focus in order to locate the landing site.

Figure 5:
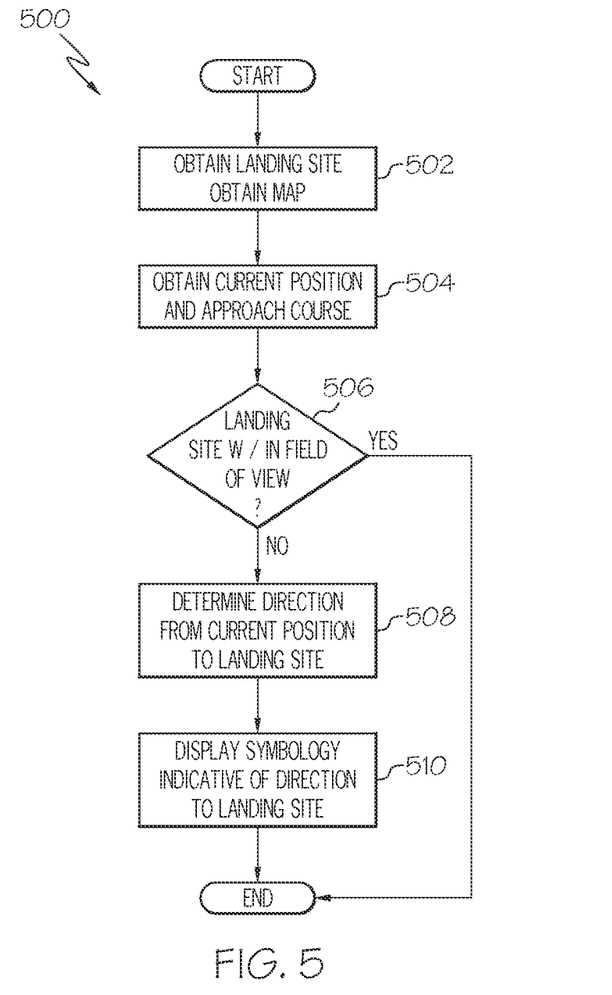
FIG. 5 is a flow chart describing steps of a landing site indicator process, in accordance with an exemplary embodiment.

FIG. 5 is a flow chart describing steps of a landing site indicator process 500 in accordance with an exemplary embodiment. While STEP 502-STEP 510 are arbitrarily shown as occurring in a sequence, in practice, these steps may be rearranged, and additional customization steps may be added.

Landing site indicator process 500 obtains avionics data such as a landing site and MAP at STEP 502. Landing site and MAP data may originate from a navigation database 109, user input via user input device 101, or a flight data services 105. At STEP 504, landing site indicator process 500 obtains additional avionics data, such as the rotorcraft current position and approach course data, typically from navigation system subsystems, such as onboard radar 112, and other onboard instrumentation 114. In response to obtaining avionics data at STEP 502 and STEP 504, processor 102 determines whether the landing site is within the pilot's field of view (alternately referred to as "the surrounding view frustum") at STEP 506. The determination of what is within field of view is based on the various subsystems of flight data services 105. Landing site indicator process 500 advantageously offers visual guidance when the desired landing side is not within the pilot's field of view, and prior to the rotorcraft reaching the location of the MAP. Specifically, process 500 provides a directional arrow, and symbology that directs the pilot's view to a smaller scan area (the safe landing area) in which the intended destination (the landing site) may be expected to be; if the landing site is within the pilot's field of view, the landing site indicator process 500 is no longer needed.

When the landing site is not within the pilot's field of view at STEP 506, and prior to reaching the location of the MAP, the landing site indicator process 500 determines the direction from the rotorcraft current position to the landing site at STEP 508, and uses the determined direction to render symbology on the display that is indicative of the direction of the landing site in STEP 510. The symbology employed by the exemplary embodiments modify the existing compass or 3D graphical display on the rotorcraft display system 103 in a variety of optionally defined ways that are described in connection with FIG. 2-FIG. 4, such as rendering an arrow and an associated visually distinguishable safe landing area, and rendering or modifying an edge of a symbol, typically a polygon, in a visually distinguishable manner. Using these methods, the exemplary embodiments are minimally intrusive to the display 106 that the pilot is already familiar with viewing.

As mentioned hereinabove, visual distinguishability may be user defined. In addition, the specific symbology and rendering techniques employed by landing site indicator process 500 may be arranged as a system default or may be entered by the pilot in a customization request via the user input device 101.

Thus, there has been provided a system and method for displaying symbology that is indicative of the direction of a landing site. The provided system and method generate and display, prior to the rotorcraft reaching the MAP, symbology that conveys visual guidance that may be quickly and easily comprehended by a pilot. The provided system and method reduce the pilot's visual scan area and associated search time, reducing cognitive workload and increasing situational awareness.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for displaying, on a rotorcraft display system, symbology indicative of the direction of a rotorcraft landing site from the rotorcraft, the method comprising:
   receiving, by a processor, avionics data comprising a rotorcraft current position, a rotorcraft current approach, and a rotorcraft landing site;
   processing the avionics data to determine a direction from the rotorcraft current position to the rotorcraft landing site;
   driving a monitor to display a composite image of navigation information overlaid with symbology indicative of the received avionics data; and
   displaying, on the composite image, symbology (i) indicative of the direction to the rotorcraft landing site from the rotorcraft current position, and (ii) indicative of a narrowed scan area surrounding the direction of the rotorcraft landing site.

2. The method of claim 1, wherein displaying symbology further comprises rendering an arrow extending from the rotorcraft current position toward the rotorcraft landing site.

3. The method of claim 2, wherein the symbology indicative of the narrowed scan area comprises a visually distinguishable predetermined shape extending plus or minus five degrees from the arrow, and overlaid on the arrow, wherein the number of degrees is customizable by the user.

4. The method of claim 2, wherein the symbology indicative of the direction to the rotorcraft landing site comprises
   a visually distinguishable predetermined shape comprising a plurality of edges surrounding the rotorcraft current position.

5. The method of claim 4, further comprising:
   identifying a first edge of the plurality of edges that is closest to the rotorcraft landing site; and
   rendering the first edge in a visually distinguishable manner with respect to the remainder of the plurality of edges.

6. The method of claim 5, further comprising altering the color of the first edge.

7. A rotorcraft display system, the system comprising:
   a source of avionics data;

a monitor; and a processor coupled to the source of avionics data and the monitor, the processor configured to (i) receive avionics data comprising a rotorcraft current position, a rotorcraft current approach course, and rotorcraft landing site information, (ii) determine therefrom a direction from the rotorcraft current position to the rotorcraft landing site, (iii) drive the monitor to display a composite image of navigation information overlaid with symbology indicative of the received avionics data; and (iv) generate symbology on the composite image that is (a) graphically indicative of the rotorcraft current position, the direction from the rotorcraft current position to the rotorcraft landing site, and a narrowed scan area surrounding the rotorcraft landing site.

8. The system of claim 7, wherein the processor is further configured to render an arrow pointing from the current position to the landing site.

9. The system of claim 8, wherein the processor is further configured to: overlay the arrow with a visually distinguishable first predetermined shape extending plus or minus five degrees from the arrow, wherein the number of degrees is customizable by the user.

10. The system of claim 9, wherein the processor is further configured to (i) display a second predetermined shape comprising a plurality of edges, (ii) identify a first edge of the plurality of edges that is closest to the rotorcraft landing site, and (iii) render the first edge in a visually distinguishable manner with respect to the remainder of the plurality of edges.

11. The system of claim 10, wherein the processor is further configured to alter the color of the first edge.

12. The system of claim 10, wherein the processor is further configured to alter the thickness of the first edge.

13. A method for displaying, on a rotorcraft display system, symbology indicative of a rotorcraft landing site, the method comprising:

receiving, by a processor, avionics data comprising a rotorcraft current position, a rotorcraft current approach, and a rotorcraft landing site;

determining, in response to the received avionics data, (i) a direction of the rotorcraft landing site from the rotorcraft current position, and (ii) a narrowed scan area around the rotorcraft landing site; and displaying symbology indicative of (i) the direction of the rotorcraft landing site from the current position, and (ii) the narrowed scan area around the rotorcraft landing site.

14. The method of claim 13, wherein displaying symbology comprises rendering an arrow extending from the rotorcraft current position toward the rotorcraft landing site.

15. The method of claim 13, wherein the symbology indicative of the direction to the rotorcraft landing site comprises a predetermined shape comprising a plurality of edges surrounding the rotorcraft.

16. The method of claim 15, wherein displaying symbology comprises rendering an arrow within the predetermined shape that extends from the rotorcraft current position to a point on the boundary of the predetermined shape that is closest to the landing site, and wherein the narrowed scan area extends equally around on each side of the arrow within the predetermined shape.

17. The method of claim 16, wherein the step of rendering comprises altering the thickness of the first edge.

18. The method of claim 15, further comprising:
identifying a first edge of the predetermined shape that is closest to the landing site; and
rendering the first edge in a visually distinguishable manner.

19. The method of claim 16, wherein the step of rendering comprises altering the color of the first edge.

20. The method of claim 15, further comprising rendering the arrow in a first color and rendering the narrowed scan area in a second color.

* * * * *